United States Patent
Hindelang et al.

(10) Patent No.: US 6,233,708 B1
(45) Date of Patent: May 15, 2001

(54) METHOD AND DEVICE FOR FRAME ERROR DETECTION

(75) Inventors: Thomas Hindelang, Munich; Christian Erben, Eching; Wen Xu, Unterhaching, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/384,703

(22) Filed: Aug. 27, 1999

Related U.S. Application Data

(63) Continuation of application No. PCT/DE98/00221, filed on Jan. 23, 1998.

(30) Foreign Application Priority Data

Feb. 27, 1997 (DE) ............................................. 197 08 022

(51) Int. Cl.⁷ ............................... G06F 11/00; H04L 1/00
(52) U.S. Cl. .......................................................... 714/747
(58) Field of Search .................................... 714/747, 746, 714/819, 709, 820, 758, 752, 824; 704/208, 206, 220

(56) References Cited

U.S. PATENT DOCUMENTS

| | | | |
|---|---|---|---|
| 5,097,507 | * 3/1992 | Zinser et al. | 704/226 |
| 5,224,167 | 6/1993 | Taniguchi et al. | 381/36 |
| 5,255,343 | 10/1993 | Su | 704/242 |
| 5,271,011 | 12/1993 | McMullan, Jr. et al. | 714/807 |
| 5,473,727 | * 12/1995 | Nishiguchi et al. | 704/222 |
| 5,497,383 | 3/1996 | Thome et al. | 714/795 |
| 5,557,639 | 9/1996 | Heikkila et al. | 375/224 |
| 5,598,506 | * 1/1997 | Wigren et al. | 704/233 |
| 5,710,781 | * 1/1998 | Zinser | 714/747 |
| 5,734,789 | * 3/1998 | Swaminathan et al. | 704/206 |
| 5,774,837 | * 6/1998 | Yeldener et al. | 704/208 |
| 5,778,338 | * 7/1998 | Jacobs et al. | 704/223 |
| 5,890,108 | * 3/1999 | Yeldener | 704/208 |
| 5,901,186 | * 5/1999 | Jamal et al. | 375/346 |

FOREIGN PATENT DOCUMENTS 8-163179  6/1996 (JP) .

OTHER PUBLICATIONS

Miya et al., Design of Error Correction Methods using Redundancy of Speech Coded Data, IEEE, p. 176–182, Feb. 1992.*
Yeldener et al., High Quality Multiband LPC Coding of Speeech at 3.4kbit/s, IEEE, p. 1287–1289, Jul. 1991.*
Muller et al., A CODEC Candidate for the GSM Half Rate Speech Channel, IEEE, p. 257–260, 1994.*
Hasib et al., Source combined linear predictive analysis in pluse–based speech coders, IEEE, p. 143–148, Jun. 1996.*
Erell et al., Energy Conditioned Spectral Estimation of Recognition of Noisy Speech, IEEE, p. 84–89, Jan. 1993.*
GSM 06.10, version 3.2.0, pp. 3–29.

(List continued on next page.)

*Primary Examiner*—Albert De Cady
*Assistant Examiner*—Shelly A Chase
(74) *Attorney, Agent, or Firm*—Herbert L. Lerner; Laurence A. Greenberg; Werner H. Stemer

(57) ABSTRACT

A frame error detection method includes the steps of determining a plurality of comparison values which include a given comparison value depending on a frame energy of a given speech frame or a change in frame energy between the given speech frame and a preceding speech frame. The given speech frame is identified as a bad speech frame if a logical combination of a plurality of criteria is met. One of the criteria is based on a comparison of a threshold value with the given comparison value depending on the frame energy or the change in frame energy. A device for frame error detection and a receiver including the device for frame error detection are also provided.

18 Claims, 2 Drawing Sheets

OTHER PUBLICATIONS

Published International Application No. 98/38764 (Hindelang et al.), dated Sep. 3, 1998.

Published International Application No. 94/17472 (Thone et al.), dated Aug. 4, 1994.

Published International Application No. 96/09704 (Järvinen et al.), dated Mar. 28, 1996.

Published International Application No. 95/30282 (Jamal et al.), dated Nov. 9, 1995.

* cited by examiner

METHOD AND DEVICE FOR FRAME ERROR DETECTION

CROSS-REFERENCE TO RELATED APPLICATION

This application is a continuation of copending International Application No. PCT/DE98/00221, filed Jan. 23, 1998, which designated the United States.

BACKGROUND OF THE INVENTION

Field of the Invention

The invention relates to a method for frame error detection in a data transmission, and to a device for performing the method.

In order to make maximum use of the limited capacity of an available transmission channel, before data transmission in the transmitting direction, especially in video, audio and speech transmission, a source coding is done in order to eliminate redundance from the data and thus compress the data to be transmitted. Often the data to be transmitted are first divided up into so-called frames. These frames can be time slots of a certain duration or can also be spectral ranges or image excerpts or segments. Then in the source coding, parameters are ascertained that describe or determine the data to be transmitted as accurately as possible. This is known as parametric source coding. One example of it in the case of speech coding is GSM full-rate coding. In speech source coding (speech coding), the ascertained parameters are also called speech coefficients.

In the transmission of these compressed data, if the channel conditions are poor, errors can occur despite protective provisions such as channel coding; then the received speech, for instance, is greatly interfered with and may even becomes unintelligible. In the GSM standard, all the received speech frames are therefore first classified as good or bad with the aid of a frame error detection criterion. The bad frames are then replaced with a frame, which typically results from extrapolating one or more previously received "good" frames. The interference in the speech can thus be reduced, and the speech intelligibility is preserved.

In GSM full-rate transmission, for instance, the speech is subdivided into frames of 20 ms each, and each frame is compressed into 260 bits by the full-rate or enhanced full-rate coder. These bits are ranked by their importance as class 1a, 1b, and class 2. The 50 bits in class 1a are secured, among other things by way of a parity check, with 3-bits. If this CRC (cyclic redundancy check) shows an error, then the frame is declared bad. The 3-bit parity check in the full-rate speech coder has a certainty of approximately 7/8 for error detection; that is, good frames are found to be bad and vice versa. Bad frames that have been detected as good are often heard as a pronounced "crackling" in the speaker of the mobile phone.

SUMMARY OF THE INVENTION

It is accordingly an object of the invention to provide a method for frame error detection and a device for performing this method which overcomes the above-mentioned disadvantages of the heretofore-known methods and devices of this general type and which can detect the frame errors more reliably. In particular it is an object of the invention to reliably detect those frames that have a good quality as good frames and to detect the frames that have a bad quality as bad frames.

With the foregoing and other objects in view there is provided, in accordance with the invention, a method for frame error detection, which comprises:

determining, in a receiver, a plurality of comparison values including a given comparison value depending on at least one of a frame energy of a given speech frame and a frame energy change between the given speech frame and a preceeding speech frame; and identifying the given speech frame as a bad speech frame if a logical combination of a plurality of criteria is met, one of the criteria being based on a comparison of the given comparison value with a threshold value.

In accordance with another mode of the invention, at least one of the comparison values is determined from a linear combination of at least one value selected from the group consisting of values based on a cyclic redundancy check, values depending on the frame energy of the given speech frame, values depending on the frame energy change between the given speech frame and the preceeding speech frame, values depending on parameters of the given speech frame ascertained from a parametric source coding process, and values depending on changes of the parameters of the given speech frame with respect to parameters of the preceding speech frame.

In accordance with yet another mode of the invention, a source coding is performed within a data transmission, the source coding including a linear predictive coding, and at least one of the comparison values is determined on the basis of a change in at least one linear predictive coding filter coefficient of the given speech frame compared with a corresponding linear predictive coding filter coefficient of the preceding speech frame.

In accordance with a further mode of the invention, a source coding is performed within a data transmission, the source coding includes a long-term prediction, and at least one of the comparison values is determined on the basis of a value of a long-term prediction delay.

In accordance with yet a further mode of the invention, a source coding is performed within a data transmission, the source coding includes a regular pulse excitation analysis, and at least one of the comparison values is determined on the basis of at least one block amplitude or on the basis of a rest energy value of a subframe.

In accordance with a further mode of the invention, an error propagation is reduced by correcting values of parameters to be stored in a memory for subsequent calculations.

With the objects of the invention in view there is also provided, a device for frame error detection, which is preferably included in a receiver, the device comprising:

a determining unit for determining a plurality of comparison values including a given comparison value depending on at least one of a frame energy of a given speech frame and a frame energy change between the given speech frame and a preceding speech frame;

a comparison unit connected to the determining unit, the comparison unit performing comparison operations including a comparison of the given comparison value with a threshold value;

a logic unit connected to the a comparison unit, the logic unit performing a logical combination of the comparison operations;

an identifier unit connected to the logic unit, the identifier unit identifying the given speech frame as a bad speech frame based on the logical combination; and a calculation unit connected to the determining unit, the calculation unit calculating the frame energy of the given speech frame.

In accordance with another feature of the invention, the calculation unit estimates the frame energy of the given speech frame.

In accordance with yet another feature of the invention, an evaluation unit is connected to the determining unit, the evaluation unit evaluating a cyclic redundancy check.

In accordance with a further feature of the invention, an ascertaining unit is connected to the determining unit, the ascertaining unit ascertaining parameters specific for data transmitted within the given speech frame and the preceding speech frame.

In accordance with another feature of the invention, a correction unit is connected to the ascertaining unit, the correction unit correcting the parameters such that an error propagation is reduced, and a storage unit is connected to the ascertaining unit, the storage unit storing corrected parameters for subsequent calculations.

The object of the invention is achieved by declaring frames as wrong if a certain logical combination of a plurality of different criteria is met. At least one criterion is to compare a so-called comparison value, which is ascertained in the receiving device, with a predetermined threshold value. If the threshold value is exceeded or undershot, then the criterion is considered to be met.

In a preferred embodiment of the invention, this comparison value is calculated by a mathematical function, whose arguments may be measured values or values that are available within the digital processing.

Another advantageous embodiment of the invention provides that at least one of the comparison values to be ascertained depends, among others, on the frame energy or its change relative to the frame energy of a preceding frame. The frame energy can also be estimated. This estimate can, particularly if a parametric source coding is performed within the data transmission in the transmitter, be made with the aid of the parameters ascertained thereby. It is thus possible to obtain an estimated value for the frame energy, without having to perform a source decoding. Hence the method is distinguished by its relative lack of complexity.

According to another feature of the invention, in which a parametric source coding is performed within the data transmission in the transmitter, at least one of the parameters ascertained in the process, or its change compared with the corresponding parameter of a preceding frame, is used to calculate at least one of the aforementioned comparison values.

A further preferred embodiment provides that at least one of these comparison values is based, among others, on the cyclic redundancy check (CRC).

By incorporating the invention into the GSM system concept, it is possible regardless of the speech coder used (full-rate, half-rate, or enhanced full-rate coder), to achieve a substantial improvement in speech quality.

Other features which are considered as characteristic for the invention are set forth in the appended claims.

Although the invention is illustrated and described herein as embodied in a method and a device for frame error detection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
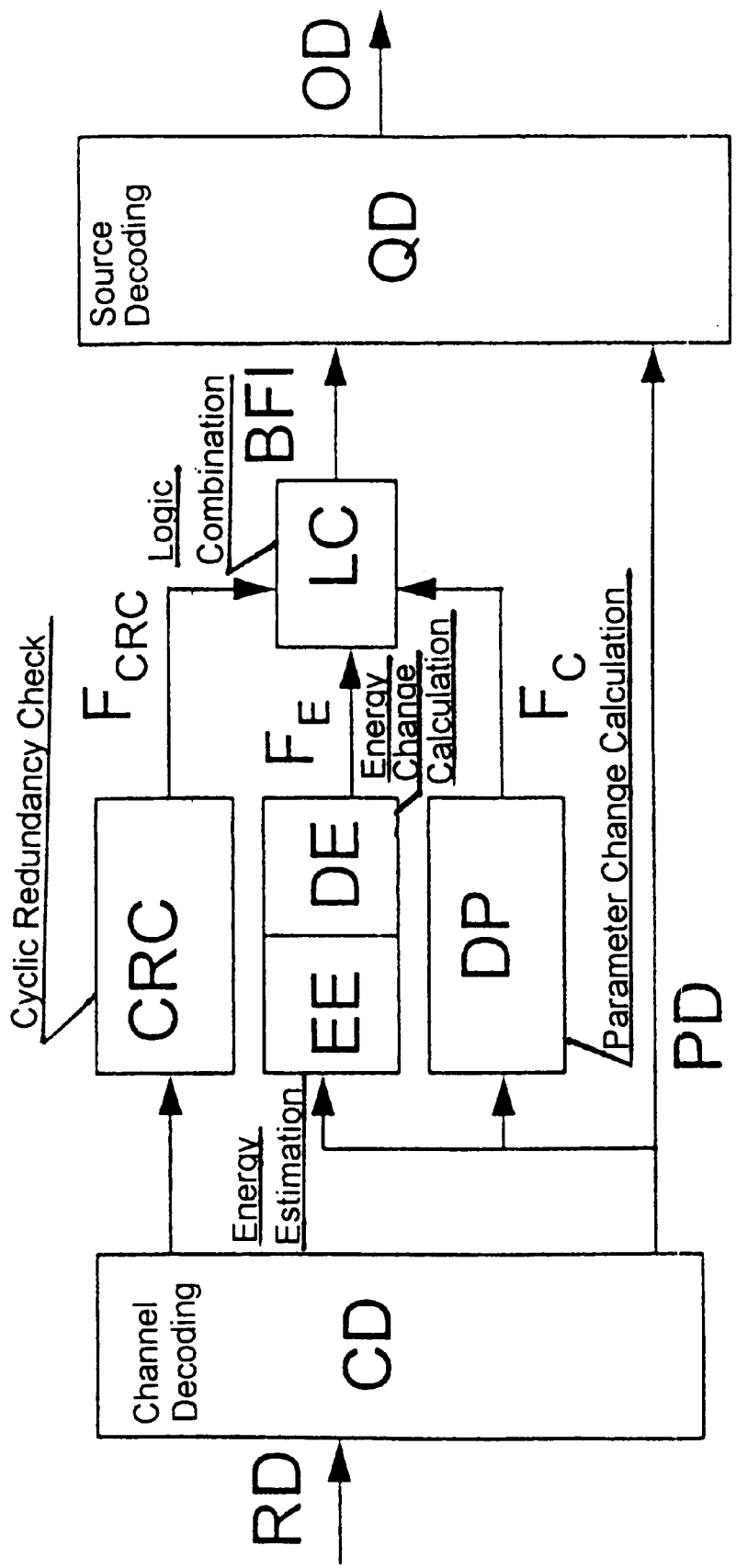
FIG. 1 is a block diagram illustrating the steps of the method for frame error detection according to the invention.
Figure 2:
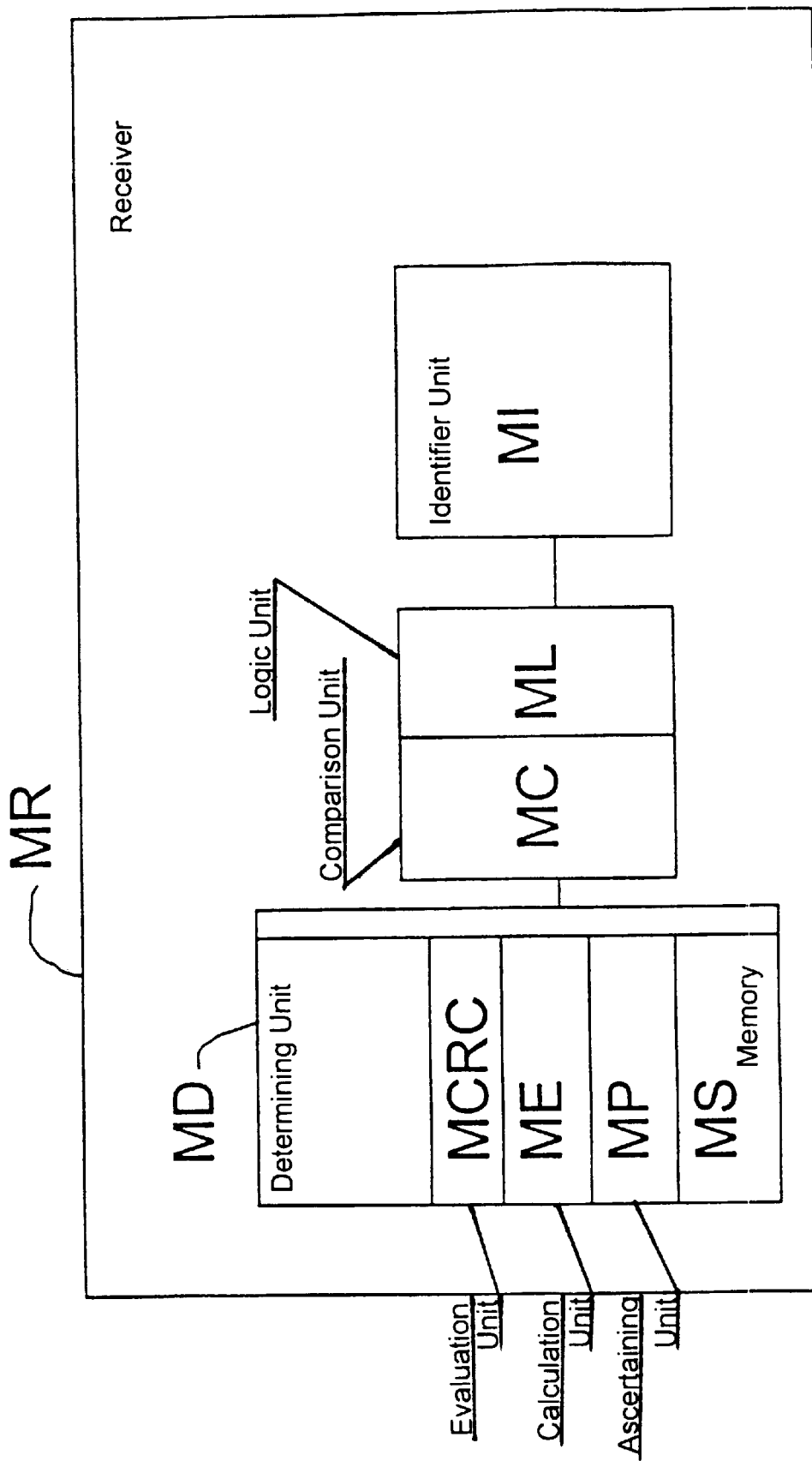
FIG. 2 is a schematic block diagram of a device for frame error detection according to the invention.

Referring now to the figures of the drawings in detail and first, particularly, to FIG. 1 thereof, there is shown that received data (RD) preferably pass through a channel decoder (CD) in a first step. After that, a cyclic redundancy check (CRC) is performed, and depending on the outcome of this check, a comparison value $F_{CRC}$ is determined. In addition, from the parameters (PD) that have been ascertained in the transmitter by a parametric source coding method, the frame energy is estimated (EE) and the change in energy compared with the energy of preceding frames is calculated (DE), and from this a comparison value $F_E$ is determined. Furthermore, the change in these parameters (PD) compared with the corresponding parameters of preceding frames is calculated (DP) and from that a comparison value $F_C$ is determined. These comparison values F are compared with threshold values, and these comparison operations are logically linked with one another (LC). Depending on the outcome of this logical linkage, a frame is declared to be bad or good. A frame declared to be bad can advantageously be marked by setting a BFI flag (Bad Frame Indication). The bad frames are then replaced in the source decoder by a frame that is obtained by extrapolation, typically from one or more previously received "good" frames. Thus, with the aid of the parameters (PD), the original data can largely be restored in the source decoder (QD) having an output (OD).

In a special embodiment of the method of the invention, within the data transmission in the transmitter, a parametric speech coding method, such as the GSM full-rate, half-rate or enhanced full-rate coding, is performed.

The comparison values F to be ascertained in the receiving device are preferably based on the following calculations performed in the receiving set:

a) CRC ($F_{CRC}$);

b) Estimating the frame energy, and in particular the absolute value of the frame energy and its change between two successive frames from the speech coefficients (parameters of the parametric source coding; $F_E$);

c) Values of individual speech coefficients (parameters of the parametric source coding) and their change between successive frames ($F_C$, $F_{CLAR}$, $F_{CX}$, $F_{CN}$)

Advantageously, for comparison values whose values are defined in the range of 0 (good) to 100 (bad), a threshold of 95 is for instance defined. If at least one of the ascertained comparison values exceeds this threshold, or if a plurality of comparison values added together exceed a higher threshold of 150, for instance, then the frame is bad; if not, it is good. If a frame is declared bad, then the BFI (Bad Frame Indication) flag is set. The determination of the BFI flag is illustrated in the following relation (1).

$$BFI = \begin{cases} 1, & \text{if} \quad (F_{CRC} > 95 \cup F_E > 95 \cup F_{CLAR} > 95 \cup F_{CX} > 95 \cup F_{CN} > 95 \cup F_{CRC} + F_E + F_C > 150) \\ 0, & \text{if not} \end{cases}$$

If the GSM full-rate speech coder is used, the individual comparison values can advantageously be ascertained as follows.

A) CRC comparison value $F_{CRC}$

The received decoded parity bits are compared with the parity bits that are ascertained from the received decoded 50 bits in class 1a. If there is no match between them, then the CRC comparison value $F_{CRC}$ is set for instance to a value of $F_{CRC}=100$ (bad frame), and if not, a value of $F_{CRC}=0$ is set.

B) Energy comparison value $F_E=F_{E1}+F_{E2}$

Energy estimation with the aid of the 76 speech coefficients of one frame.

The energy of one speech frame, which is 20 ms long, is unknown before the speech decoding. In order not to have to perform speech decoding twice, the frame energy $E_{GES}$ can be estimated from the 76 speech coefficients. This energy estimate can preferably be made as follows:

First, a so-called energy $E_{rest}$ is determined by the following formula for the subframe m, which is 5 ms in length (m=0, 1, 2, 3)

$$E_{rest}(m) = \sum_{i=0}^{12} \left( \frac{x_m(i) - 3.5}{4} \right)^2 * x'^2_{max} \quad (2)$$

in which $x'_{max}$ represents the delogarithmized coefficient $x_{max}$ (block amplitude), and $x_m$ (i) represents the RPE pulses of the subframe m. A functional description of RPE coding is given in the "GSM Recommendations" GSM 06.10, Chapter 3.

In the next step, in a rough approximation, the energy $E_{Subfr}$ for the current subframe m is ascertained. In this process, depending on the LTP (Long Term Predictor) delay N and the amount of similarity $q_b$, the energy of the third from last, next to last or previous subframe is added to the energy $E_{rest}$, weighted in each case with $q_b$:

$$E_{Subfr}(m) = E_{rest}(m) + q_b \cdot E_{Subfr}(m-1) \quad (3)$$

The following advantageous allocation for the subframes m−1 (1=1,2,3; if m−1<0, this corresponds to the subframe m−1+4 of the last total frame that was identified as being "good") and the weighting $q_b$ depending on the LTP delay N $9^{th}$, $26^{th}$, $43^{rd}$, and $60^{th}$ coefficient, each quantized with 7 bits) and the value b ($10^{th}$, $27^{th}$, $44^{th}$ and $61^{st}$ coefficient, each quantized with 2 bits) is conceivable (see also the "GSM Recommendations" GSM 06.10, Chapter 3):

TABLE 1

Allocation of the coefficient b to the quality q

| b | $q_b$ |
|---|---|
| 0 | 0.1 |
| 1 | 0.35 |
| 2 | 0.65 |
| 3 | 1.0 |

TABLE 2

Allocation of the coefficient N to the number of the subframe

| Delay N | Subframe (m − 1) |
|---|---|
| ≤60 | m − 1 |
| 61 . . . 100 | m − 2 |
| ≥101 | m − 3 |

The energy $E_{Subfr}$ is determined for all four subframes, each subframe being 5 ms long. If an error is found in the preceding frame (if the BFI flag is set), then a reference is made to the last good frame, and the energy per erroneous frame is damped by 20%, for instance.

The energy $E_{HP}$ before the concluding Deem phase is calculated as follows:

$$E_{HP}(m) = E_{Subfr}(m) * \prod_{i=1}^{8} \frac{1}{1 - r_m(i)^2} \quad (4)$$

in which $r_m$ (i) stands for the reflection coefficients calculated from the LAR (Log.-Area Ratio) coefficients (see "GSM Recommendations" GSM 06.10, Chapter 3). The energies EHP for four subframes are added together and thus yield the total energy of one frame before the Deem phase through the low-pass filter. This energy is logarithmized and then the numerical value 23 (chosen arbitrarily) is subtracted from the result. A value of 0 dB then corresponds to a very faint background noise.

$$E_{\log} = 10 * \log_{10}\left( \sum_{m=1}^{4} E_{HP}(m) \right) - 23 \quad [dB] \quad (5)$$

The energy is changed only a little bit by the high-pass filter. The following is therefore obtained:

$$E_{Ges} \approx E_{Log} \quad (6)$$

Determination of the energy comparison value $F_E=F_{E1}+F_{E2}$ i) $F_{E1}$: Measurements of many speech samples have shown that the energy of a speech signal $E=E_m$ ($E_m$=energy $E_{ges}$ of the current frame) never exceeds a certain value of 57 dB, for instance, and rarely exceeds a value of 48 dB. On example for realizing the calculation of $F_{E1}$ is shown in the following:

$$F_{E1} = \begin{cases} 100 & (E > 57 \, dB) \\ 10*(E - 48) & (48 < E \le 57 \, dB) \\ 0 & (E \le 48 \, dB) \end{cases} \quad (7)$$

ii) $F_{E2}$: The change in energy $\Delta E=|E_m-E_{m-1}|$ between a current frame and a preceding frame is normally less than a certain limit value $\Delta E_{max}$. However, this change is dependent on the absolute energy $E_m$. If a greater change occurs, then there is a very high probability that a transmission error in the channel is has occurred. In addition, limit values $\Delta E_{rare}$ for the energy changes, which occur very seldom (for instance less than 5%), also exist. In the following table, one possible realization of these two limit values is shown; the absolute energy is described in 5 dB steps as $\min\{E_{m-1}, E_m\}$.

TABLE 3

Maximum of allowed energy change and rarely occurring energy change (beyond this value, an energy comparison value is calculated which is a measure for the error probability in the current speech frame) as a function of the absolute energy of the speech frame.

| $\min\{E_{m-1}, E_m\}$ | [dB] | <5 | <10 | <15 | <20 | <25 | <30 | <35 | <40 | <45 | <50 | <55 | <57 | ab 57 |
|---|---|---|---|---|---|---|---|---|---|---|---|---|---|---|
| $\Delta E_{max}$ | [dB] | 42 | 39 | 36 | 30 | 27 | 24 | 20 | 16 | 12 | 9 | 6 | 3 | 0 |
| $\Delta E_{rare}$ | [dB] | 22 | 19 | 18 | 17 | 15 | 14 | 12 | 9 | 6 | 4 | 3 | 1 | — |

Table 3: Maximum of allowed energy change and rarely occurring energy change (beyond this value, an energy comparison value is calculated which is a measure for the error probability in the current speech frame) as a function of the absolute energy of the speech frame.

One conceivable variant realization for calculating $F_{E2}$ is shown as follows:

$$F_{E2} = \begin{cases} 100 & (\Delta E > \Delta E_{max}) \\ 10 * \dfrac{\Delta E - \Delta E_{rare}}{\Delta E_{max} - \Delta E_{rare}} & (\Delta E_{rare} < \Delta E \leq \Delta E_{max}) \\ 0 & (\Delta E \leq \Delta E_{rare}) \end{cases} \quad (8)$$

The maximum for the energy comparison value $F_E$ is preferably limited to 100.

C) Coefficient comparison values $F_C$, $F_{CLAR}$, $F_{CX}$, $F_{CN}$

Statistical investigations of speech frames have shown that some of the 76 speech coefficients that are generated in the GSM full-rate speech coder vary only very slightly; this includes the eight LAR coefficients from the LPC analysis and the four $X_{max}$ coefficients from the RPE analysis. This correlation of the coefficients can therefore be employed to detect frame errors. If the change is greater than a certain value, then this can with high likelihood be ascribed to a channel error. The four LTP delay coefficients represent a special case, whose absolute allowed range of values is limited. If a received value is outside that range, this can be taken into account for the frame error detection.

Advantageously, the coefficient comparison values can be determined as follows:

i) $F_{CLAR}$: As in the energy consideration, a maximum value by which the coefficients change is indicated. If the change is even greater, the coefficient comparison value $F_{CLAR}$ is set to 100. There is also a change that occurs very seldom (in fewer than 5% of the cases). Between these two values, the coefficient comparison value $F_{CLAR}$ is increased linearly from 0 to 100. In the following table, a possible allocation of these values to the eight LAR coefficients is shown:

TABLE 4

Range of values, maximum allowed change, and rarely occurring change (beyond this value, a coefficient comparison value is calculated, which is a measure for the likelihood of error in the current speech frame) as a function of the number of the speech coefficient.

| Coefficient LAR | 1 | 2 | 3 | 4 | 5 | 6 | 7 | 8 |
|---|---|---|---|---|---|---|---|---|
| Value Range | 0–63 | 0–63 | 0–31 | 0–31 | 0–15 | 0–15 | 0–7 | 0–7 |
| $\Delta_{max}$ | 31 | 31 | 15 | 15 | 8 | 8 | — | — |
| $\Delta_{rare}$ | 24 | 24 | 12 | 12 | 6 | 6 | 4 | 4 |

Since the LAR coefficients 7 and 8 are not as significant for the intelligibility of the speech, the coefficient comparison value $F_{CLAR}$ is set to 40, if the change is from 5 to 7, and to 20, if the change is 4. The coefficient comparison value $F_{CLAR}$ is under no circumstances set to 100, which is why no maximally allowed $\Delta_{max}$ is indicated. Since a major change nevertheless is an indication of a channel error, and channel errors usually occur in clusters (fading), the LAR coefficients 7 and 8 are taken into account to a certain extent. The result obtained is thus an additional value for the coefficient criterion, which makes it possible to have a more certain decision concerning a channel error. In the second line of the table, the range of values that the LAR coefficients can assume is shown.

ii) $F_{cx}$: The coefficient $x_{max}$ (block amplitude) is ascertained per subframe; in other words, for every 20 ms frame, it is provided four times. On the one hand, the sum of the four changes of $x_{max}$ between the individual subframes is calculated. If this value is greater than 64, then the coefficient comparison value $F_{cx}$ is set to 100; for values between 48 and 64, it is calculated linearly from 0 to 100. On the other hand, the maximum value of the four changes is determined. If it is greater than 31, then the coefficient comparison value $F_{cx}$ is set to 100, and for values of 24 through 31, it is raised linearly from 0 to 100.

iii) $F_{CN}$: The LTP delay N is quantized with 7 bits and thus has a range of values from 0 to 127. Due to the definition of the LTP analysis, however, a range of only between 40 and 120 is permitted. Thus a value from 0 tp 39 or from 121 to 127 can always be ascribed to a channel error. Since such a value virtually always represents an error in the class 1a bits (6 of the 7 bits of this LTP coefficient are class 1a bits, so that only a value change from 120 to 121 is not an error in the class 1a bits), it follows that such a value is virtually always an indication of errors in the class 1a bits. These errors are especially disturbing and problematic. A coefficient comparison value $F_{CN}$ can therefore be defined advantageously and simply as follows:

$$F_{CN} = \begin{cases} 100 & (N > 120 \cup N < 40) \\ 0 & \text{if not} \end{cases} \quad (9)$$

iv) $F_C$: The values $F_{CLAR}$, $F_{CX}$, $F_{CN}$ are added together and yield the coefficient comparison value $F_C$. The maximum value for it is therefore preferably limited to 140.

Because a current value is always compared with a previous value when changes occur, the risk of error propagation exists whenever an erroneous parameter is stored in memory and is thus used as a comparison value for the next frame. As a result, a frame error may subsequently be detected even though the received bits were all correct. To rule out the possibility of error propagation as much as possible, the comparison of a wrongly stored value with a new value should preferably be avoided. To that end, preferably the old values can be corrected before being stored in memory. One possible way of storing the old values in memory will now be described. First, reference will be made to the LAR coefficients 1 through 6. If the change in the two LAR values is greater than the maximum value shown in Table 4, then the following value is stored in memory $$LAR_s[i] = \begin{cases} (2*LAR_o[i] + LAR_0[i] - \Delta_{\max}(i))/3, & \text{if } LAR_{akt} \le LAR_0 \\ (2*LAR_o[i] + LAR_0[i] + \Delta_{\max}(i))/3, & \text{if } LAR_{akt} > LAR_0 \end{cases} \quad (10)$$

with $i \in \{1 \ldots 6\}$ in which $LAR_s$ is the new value to be stored in memory, $LAR_0$ is the old value, and $LAR_{akt}$ is the current received value. With this calculation, the possibility that a lesser or smaller change in the corresponding direction has occurred is taken into account. If the change is between the two values shown in the table, then $$LAR_s[i] = (2 * LAR_0[i] + LAR_{akt}[i])/3 \; i \in \{1 \ldots 6\} \quad (11)$$

in which $LAR_{akt}$ is the current frame value. For the LAR coefficients 7 and 8, the value is set to 3, if the old stored value is <4 and if the change was at least 4, and is set to 4 if the old stored value was >4. The probability that in the next frame $F_{CLAR}$ will be raised because of the LAR coefficients 7 and 8 is consequently very small. An error propagation due to less significant coefficients would be especially disturbing and problematic.

For all eight LAR coefficients follows $LAR_s[i] = LAR_{akt}[i]$, if the change is less than $\Delta_{rare}$.

For the coefficient $X_{max}$, the change in the coefficient between the third and fourth subframes is looked at. If this change is at most 20, then the value of the fourth subframe is stored in memory for the next pass; if not, the mean value is formed from the old stored value and the four current values.

For one skilled in the art, it is easy to employ the embodiment of the method of the invention for frame error detection described here, in other methods. In particular, the method of the invention can be employed in parametric source coding methods, such as half-rate or enhanced full-rate coding, but also in audio and video source coding, by ascertaining comparison values for the frame energy and the parameters adapted to the particular type of data to be transmitted.

A configuration corresponding to the method of the invention may for example be provided in a receiver MR and provides a digital processor (determining unit MD, comparison unit MC, logic unit ML, identifier unit MI), which ascertains the aforementioned comparison values with a procedure within a program and compares these comparison values with threshold values. This digital processing unit also links these comparison operations logically with one another and provides frames with a marking (BFI) if this aforementioned logical combination is met. This processor also calculates current values to be stored in a memory MS, so that the appropriate comparisons can be made in a comparison unit MC.

The digital signal processing unit (evaluation unit MCRC, calculation unit ME, ascertaining unit MP) of a preferred embodiment of the configuration of the invention also performs a CRC and ascertains parameters that are calculated within the data transmission by a parametric source coding method and estimates the frame energy with the aid of these parameters.

A further configuration according to the invention also has memories (MS) for storing possibly corrected parameters that are needed for later calculations, so that the appropriate comparisons can be made.

The devices recited for setting up the configurations described above are realized by one skilled in the art for instance with the aid of suitable software modules, which run on processors that are typically provided in communications terminal equipment of the type mentioned above. The description of the method of the invention enables one skilled in the art to readily set up such software modules.

We claim:

1. A method for frame error detection, which comprises:
   determining, in a receiver, a plurality of comparison values including a given comparison value depending on at least one of a frame energy of a given speech frame and a frame energy change between the given speech frame and a preceeding speech frame; and
   identifying the given speech frame as a bad speech frame if a logical combination of a plurality of criteria is met, one of the criteria being based on a comparison of the given comparison value with a threshold value.

2. The method according to claim 1, wherein the determining step includes estimating at least one of the frame energy and the frame energy change.

3. The method according to claim 1, which comprises calculating at least one of the comparison values with a mathematical function having arguments with values other than the given comparison value.

4. The method according to claim 1, which comprises determining, with a parametric source coding process performed within a data transmission, at least one of the comparison values on the basis of at least one of parameters of the given speech frame and changes of the parameters of the given speech frame with respect to parameters of the preceding speech frame.

5. The method according to claim 1, which comprises determining at least one of the comparison values on the basis of a cyclic redundancy check.

6. The method according to claim 1, which comprises determining at least one of the comparison values from a linear combination of at least one value selected from the group consisting of values based on a cyclic redundancy check, values depending on the frame energy of the given speech frame, values depending on the frame energy change between the given speech frame and the preceeding speech frame, values depending on parameters of the given speech frame ascertained from a parametric source coding process, and values depending on changes of the parameters of the given speech frame with respect to parameters of the preceding speech frame.

7. The method according to claim 6, wherein the determining step includes estimating at least one of the frame energy and the frame energy change.

8. The method according to claim 1, which comprises:
performing a source coding within a data transmission, the source coding including a linear predictive coding; and
determining at least one of the comparison values on the basis of a change in at least one linear predictive coding filter coefficient of the given speech frame compared with a corresponding linear predictive coding filter coefficient of the preceding speech frame.

9. The method according to claim 1, which comprises:
performing a source coding within a data transmission, the source coding including a long-term prediction; and
determining at least one of the comparison values on the basis of a value of a long-term prediction delay.

10. The method according to claim 1, which comprises:
performing a source coding within a data transmission, the source coding including a regular pulse excitation analysis; and
determining at least one of the comparison values on the basis of at least one block amplitude.

11. The method according to claim 1, which comprises:
performing a source coding within a data transmission, the source coding including a regular pulse excitation analysis; and
determining at least one of the comparison values on the basis of a rest energy value of a subframe.

12. The method according to claim 1, which comprises reducing an error propagation by correcting values of parameters to be stored in a memory for subsequent calculations.

13. A device for frame error detection, comprising:
a determining unit for determining a plurality of comparison values including a given comparison value depending on at least one of a frame energy of a given speech frame and a frame energy change between the given speech frame and a preceding speech frame;
a comparison unit connected to said determining unit, said comparison unit performing comparison operations including a comparison of the given comparison value with a threshold value;
a logic unit connected to said a comparison unit, said logic unit performing a logical combination of the comparison operations;
an identifier unit connected to said logic unit, said identifier unit identifying the given speech frame as a bad speech frame based on the logical combination; and
a calculation unit connected to said determining unit, said calculation unit calculating the frame energy of the given speech frame.

14. The device according to claim 13, wherein said calculation unit estimates the frame energy of the given speech frame.

15. The device according to claim 13, including an evaluation unit connected to said determining unit, said evaluation unit evaluating a cyclic redundancy check.

16. The device according to claim 13, including an ascertaining unit connected to said determining unit, said ascertaining unit ascertaining parameters specific for data transmitted within the given speech frame and the preceding speech frame.

17. The device according to claim 16, including:
a correction unit connected to said ascertaining unit, said correction unit correcting the parameters such that an error propagation is reduced; and
a storage unit connected to said ascertaining unit, said storage unit storing corrected parameters for subsequent calculations.

18. A receiver, comprising:
a device for frame error detection having:
a determining unit for determining a plurality of comparison values including a given comparison value depending on at least one of a frame energy of a given speech frame and a frame energy change between the given speech frame and a preceding speech frame;
a comparison unit connected to said determining unit, said comparison unit performing comparison operations including a comparison of the given comparison value with a threshold value;
a logic unit connected to said comparison unit, said logic unit performing a logical combination of the comparison operations;
an identifier unit connected to said logic unit, said identifier unit identifying the given speech frame as a bad speech frame based on the logical combination; and
a calculation unit connected to said determining unit, said calculation unit calculating the frame energy of the given speech frame.

* * * * *